US006917960B1

United States Patent
Decasper et al.

(12) United States Patent
(10) Patent No.: US 6,917,960 B1
(45) Date of Patent: Jul. 12, 2005

(54) INTELLIGENT CONTENT PRECACHING

(75) Inventors: Dan S. Decasper, San Mateo, CA (US); Zubin Dittia, Sunnyvale, CA (US)

(73) Assignee: Jibe Networks, San Mateo, CA (US)

( * ) Notice: Subject to any disclaimer, the term of this patent is extended or adjusted under 35 U.S.C. 154(b) by 0 days.

(21) Appl. No.: 09/566,068

(22) Filed: May 5, 2000

(51) Int. Cl.[7] .................................. G06F 15/16
(52) U.S. Cl. ............... 709/203; 709/216; 709/217; 709/218; 709/219; 707/10
(58) Field of Search ............... 709/217–218; 707/3, 4, 6, 10; 711/140, 150

(56) References Cited

U.S. PATENT DOCUMENTS 5,768,528 A    6/1998  Stumm
6,052,730 A  * 4/2000  Felciano et al. ............ 709/225
6,366,933 B1 * 4/2002  Ball et al. .................... 707/511
6,490,587 B2 * 12/2002 Easty et al. .................. 707/10

* cited by examiner

Primary Examiner—Jack B. Harvey
Assistant Examiner—Hieu Le
(74) Attorney, Agent, or Firm—Blakely, Sokoloff, Taylor & Zafman, LLP

(57) ABSTRACT

A method and apparatus for content precaching is described. In one embodiment, the method comprises periodically checking servers in a networked environment for new content based on a profile, storing content identified as new on the servers in a cache accessible by an network access gateway, the network access gateway thereafter detecting whether a request is for at least a portion of the identified new content previously stored in the cache, and returning the at least a portion of the identified new content from the cache.

63 Claims, 3 Drawing Sheets

INTELLIGENT CONTENT PRECACHING

FIELD OF THE INVENTION

The present invention relates to the field of content precaching in a networked environment; more particularly, the present invention relates to precaching bandwidth intensive content at locations closer to end users that are likely to access them.

BACKGROUND OF THE INVENTION

The World Wide Web ("web") uses the client-server model to communicate information between clients and servers. Web servers are coupled to the Internet and respond to document requests from web clients. Web clients (e.g., web "browsers") are programs that allow a user to simply access web documents located on web servers.

An example of a client-server system interconnected through the Internet may include a remote server system interconnected through the Internet to a client system. The client system may include conventional components such as a processor, a memory (e.g., RAM), a bus which coupled the processor and memory, a mass storage device (e.g., a magnetic hard disk or an optical storage disk) coupled to the processor and memory through an I/O controller and a network interface, such as a conventional modem. The server system also may include conventional components such as a processor, memory (e.g., RAM), a bus which coupled the processor and memory, a mass storage device (e.g., a magnetic or optical disk) coupled to the processor and memory through an I/O controller and a network interface, such as a conventional modem.

To define the addresses of resources on the Internet, Uniform Resource Locator (URL) system are used. A URL is a descriptor that specifically defines a type of Internet resource and its location. To access an initial web document, the user enters the URL for a web document into a web browser program. Then, a request is made by a client system, such as a router or other network device, and is sent out over the network to a web server. Thus, the web browser sends a request to the server that has the web document using the URL. The web server responds to the request and sends the desired content back over the network to the requester. For example, the web server responds to the http request by sending the requested object to the client. In many cases, the object is an plain text (ASCII) document containing text (in ASCII) that is written in HyperText Markup Language (HTML); however, the object may be video clip, movie or other high quality content.

A problem with the Internet is that it has limited bandwidth resources and different points in the Internet may experience network congestion, resulting in poor performance especially for bandwidth-intensive applications. Internet backbone is often pairfully to slow. The bandwidth limitation is mainly due to one or more congested links between the web server and the client. Broadband access can help but does not help if the congestion occurs deeper in the network.

One prior art solution to accommodate the slowness of the Internet backbone is to move content closer to individuals desiring the content. To that end, content may be cached on the carrier edge and requests for such content may be serviced from these caches, instead of the web server servicing the requests. Distributing content in this manner can require large numbers of cache memories being deployed at the carrier edge and each cache memory stores content from a number of sites. When a request is made for content from a site that has been stored in one (or more) of the cache memories that is closer to the requester than the original website, the request is satisfied from the cache. In such a situation, the interactive experience is improved significantly only if content from the site has been stored in the cache and the individual making the request is close enough to one of the servers supporting such a cache to satisfy requests with the content stored therein. This is referred to as carrier edge caching. One provider of such a service is Akamai. Also, such an arrangement for caching content requires that the content owner and the entity caching the content enter an agreement with respect to the access for that content so that the content can be stored ahead of time.

Even if using content distribution, the link between the point of access to the network for the content requester may remain a bottleneck for applications requiring very large amounts of bandwidth, such as high quality video.

SUMMARY OF THE INVENTION

A method and apparatus for content precaching is described. In one embodiment, the method comprises periodically checking servers in a networked environment for new content based on a profile, storing content identified as new on the servers in a cache accessible by an network access gateway, the network access gateway thereafter detecting whether a request is for at least a portion of the identified new content previously stored in the cache, and returning at least a portion of the identified new content from the cache.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
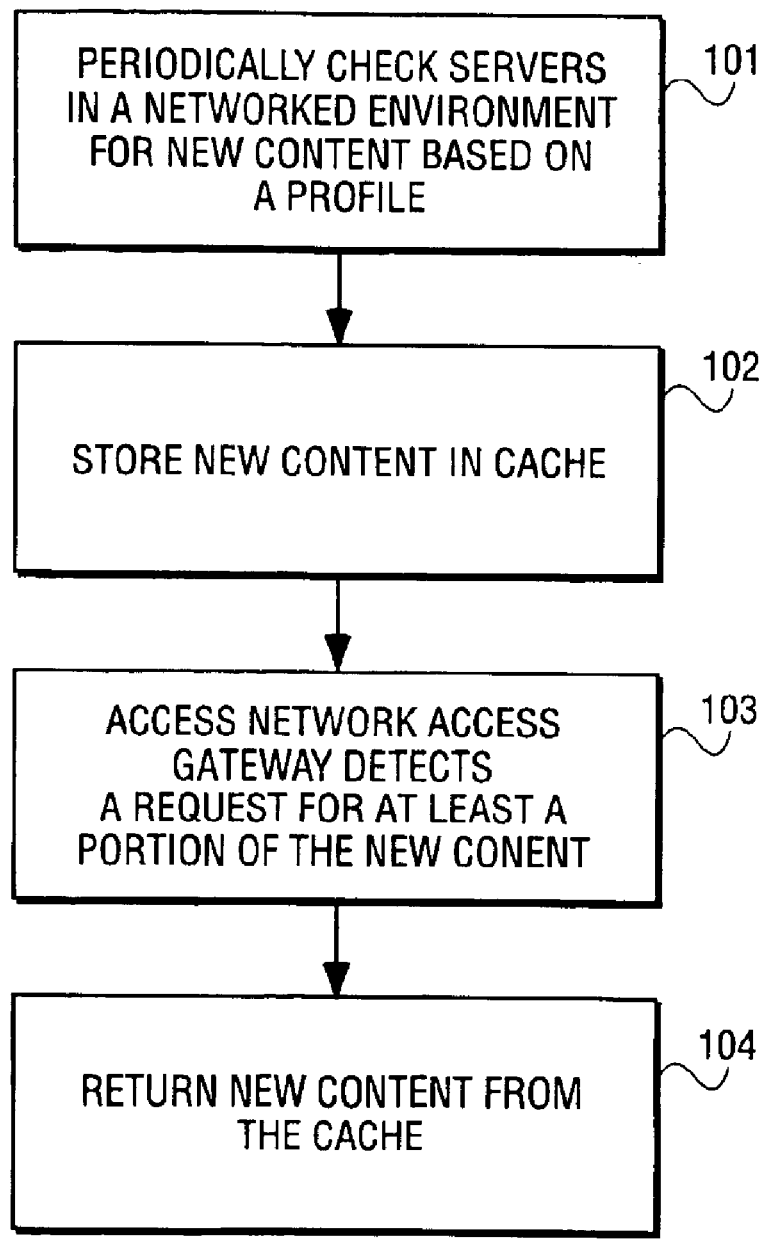
FIG. 1 illustrates a flow diagram of a process for content precaching.

A method and apparatus for intelligent content precaching is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The intelligent precache control described herein involves building a user profile, performing a crawl and intercepting request for the control and satisfy them out of the precache memory. FIG. 1 is a flow diagram illustrating one embodiment of the content precaching process. The process may be performed by processing logic that comprises hardware, software, or a combination of both.

Referring to FIG. 1, the process begins with processing logic periodically checking servers in a networked environment for new or updated content based on a profile (processing block 101). Processing logic stores such content in a precache memory accessible by network access gateway (processing block 102).

Thereafter, the network access gateway detects a request for at least a portion of the new/updated content that had been stored in the precache memory (processing block 103). The content comprises objects (e.g., content objects) that may include web pages, video files, audio files, source code, executable code, programs (e.g., games), archives of one or more of these types of objects, databases, etc. Then processing logic returns the content object(s) from the cache (processing block 104).

In one embodiment, network access gateway runs on a platform and maintains the profile. The network access gateway may be an end point of a network or one or multiple hops away from the end point of a network (e.g., a local area network). The network access gateway uses the profile to obtain and precache content objects prior to requests based on one or more profiles, such as user profiles. The content object could be pushed to the precache memory or the profile could be configured remotely to have the network access gateway pull the content object at a specified point in time. The content object can be stored in the precache memory during off peak hours. Because bandwidth is plentiful and congestion is practically non-existent on LANs in the access premises, LANs are a logical place to employ precaching techniques described herein.

When an end system makes a request for a content object, the network access gateway intercepts the request and checks to determine if it has the content object stored locally. If it does, then the network access gateway sends the content object over the local network (e.g., LAN). If not, then the network access gateway sends the request over the network to the server hosting the content object, which services the request.

One Embodiment of an Architecture for Content Precaching

Figure 2A:
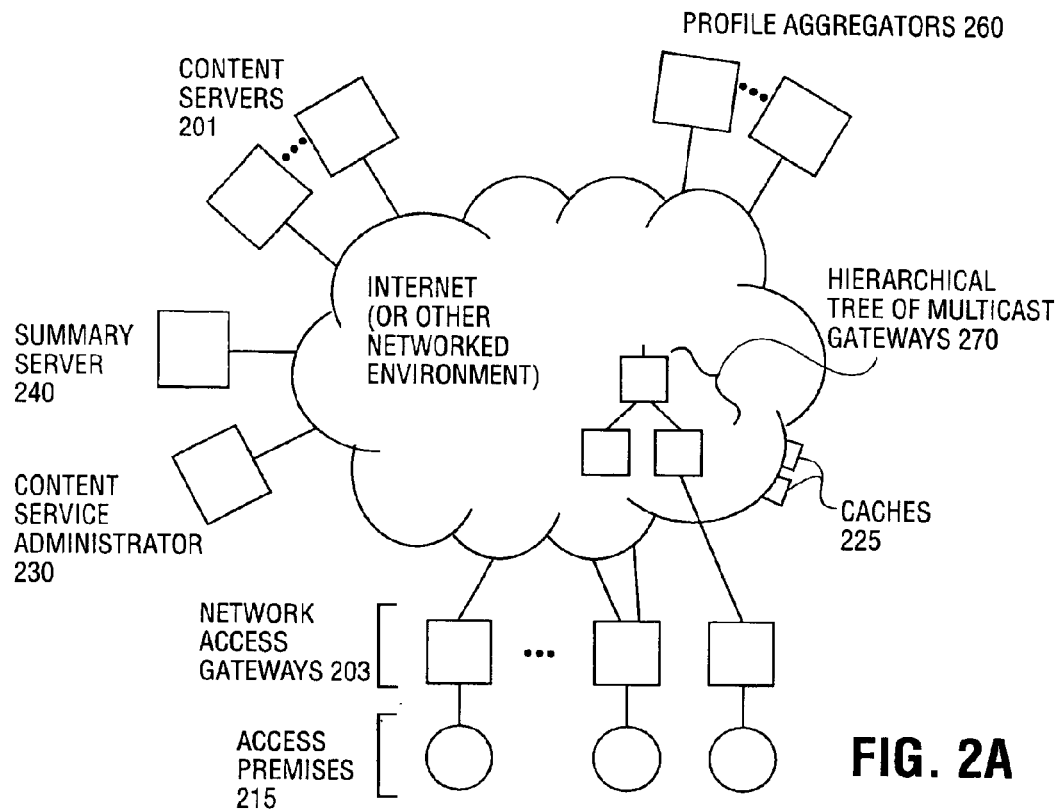
FIG. 2A illustrates one embodiment of a precaching architecture.

FIG. 2A illustrates one embodiment of an architecture for the content precaching described herein. Referring to FIG. 2, one or more content servers (e.g., web servers, video servers, audio servers, etc.) 201 are coupled to the internet 202 or another networked environment. One or more network access gateways 203 is coupled to internet 202 to provide access to access premises 215. This coupling may be by an ISP or multiple ISPs. Network access gateway 203 may comprise a PC, work station, network appliance device, web pad, wireless phone or other communication device. Network access gateway 203 may comprise software on a computer system at the end point in a LAN. In one embodiment, the precache memory is part of network access gateway 203. In another embodiment, the precache memory is on the LAN or is linked to network access gateway 203.

Figure 2B:
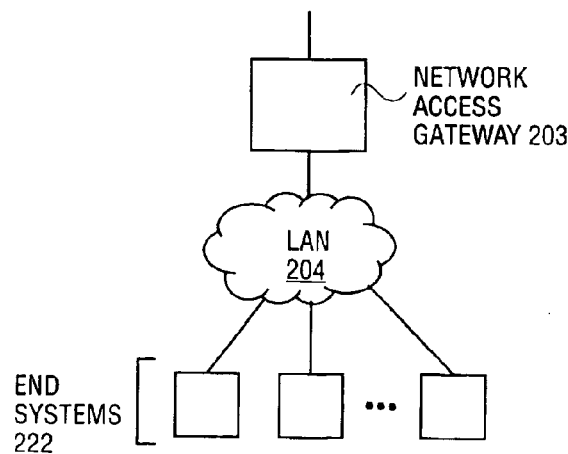
FIG. 2B is a block diagram of one embodiment of an access premises.

FIG. 2B illustrates one embodiment of an access premises. Referring to FIG. 2B, access premises comprises a local area network (LAN) 204 coupled to one or more end systems 222. End systems 222 may comprise one or more personal computers (PCs), work stations, web pads, network appliances, printers, telephones, and other network devices. Network access gateway device 203 may be implemented on a service gateway (e.g., a router, other network device) in the LAN or as an end point on the LAN.

Network access gateway 203 maintains a profile for end systems 222 (e.g., PCs) on LAN 204. In one embodiment, the profile is built based on extracting user access patterns and, from those access patterns, determining what content the end user desires to access next and when the end user will want to see it. Network access gateway 203 downloads content objects from servers indicated in the profile. In one embodiment, network access gateway 203 periodically checks the servers indicated in the profile for new content objects and downloads only the new content objects. Network access gateway 203 may selectively download content object based on content attributes such as the size of the object. For example, in one embodiment, network access gateway 203 may download bandwidth intensive content such as, for example, movies, video, software, images, sound files, code, games, etc. Network access gateway 203 stores the content locally in one or more precache memories. The precache memory may be part of network access gateway 203 or is at least accessible by it, for example, over LAN 204. The content may be downloaded on the end user's premises. In one embodiment, the downloading occurs without interfering with any other interactive network traffic.

One of end systems 222 may generate requests to download specific content from the network. Network access gateway 203 monitors these requests and detects when the requests are for a content object that has been previously downloaded by network access gateway 203 and stored locally. If network access gateway 203 detects such a request, network access gateway 203 intercepts the request and satisfies the request by returning stored content object from its local precache memory. If the request is for a content object that is not in the precache memory, network access gateway 203 forwards the request onto the network. Thus, requests for a specific type of bandwidth intensive content are intercepted. Network access gateway 203 is configurable to intercept requests for a certain type of content object.

Network access gateway 203 may intercept requests for content objects in different ways. For example, in one embodiment, the network access gateway 203 monitors requests and when there is a request for a content object stored by (or for access by) the network access gateway 203, it takes the request and responds to the request as if it were originally addressed for the network access gateway 203. Thus, the end system receives the content object as if it had received the content from the original server hosting the content. This is one example of an implicit way to translate an access for a content object to a locally cached object. The interception of requests may be done explicitly where an end system is aware of the new location of the object (e.g., through DNS lookup). In one embodiment, the network access gateway 203 checks for certain types of requests, which correspond to content available in the precache memory (e.g., all *.mov files). If such a request is detected, the network access gateway searches the precache memory for the requested URL.

Thus, with content cached locally, network access gateway 203 detects requests for embedded objects, checks the precache memory to determine if the embedded objects are stored locally, and returns the object from the precache memory if available. If the content is not available, the request is sent onto the network (e.g., the internet).

Building User Profiles

The network access gateway creates a profile for an end user that is coupled to the network access gateway via the LAN. The profile may comprise a list of resource locators (e.g., URLs), object type, object size, and a time stamp associated with the URLs to provide information as to when the end user accessed the resource. In one embodiment, the profile comprises URLs and access times, identifying web sites or portions of web sites, and when the user tends to access them.

The network access gateway may build the user profile in a number of different ways. In one embodiment, a user profile may be developed based on the user's browsing patterns. The network access gateway tracks user's access patterns that may include tracking the web sites a user visits, the time a user accesses those sites, and the frequency of access may be identified and then used to define the user's browsing patterns. In one embodiment, combining this information with information about the average size of certain types of objects and the availability of bandwidth to any given site allows a determination to be made as to when to begin checking a site for new or updated content to ensure such content is available locally at the time it is likely to be accessed.

In an alternative embodiment, the profile may be manually set by an individual, such as, for example, the user. The user may provide the specific URLs and access times manually to the profile. For example, if a user checks a set of web sites at a predetermined time during the day, the user can configure the network access gateway to access the web sites prior to that time each day to obtain updated or new content.

In still another embodiment, the profiles may be configured by, or built, using input from, a network administrator or manager, such as content service administrator 230. In such a case, the network access gateway would be accessible via the network, such as by, for example, an internet service provider (ISP), application service provider (ASP), or content provider, and the profile could be configured through that access. An example of its use might be where the ISP provides a service by which a video movie is provided once a day to an end user. The individual could choose to watch the movie or not because the movie would have been already downloaded. Profiles may also be configured by a content server or a content provider.

A profile may be developed for a user using a combination of two or more of these profile building methods. Further priorities can be assigned to URLs stored in the precache memory in case of conflicting access times. In one embodiment, user configured URLs have priority over learned URLs (developed from tracking user access patterns) and network administrator configured URLs.

The Crawling Operation

The information maintained by the network access gateway is maintained with up-to-date content. In one embodiment, the network access gateway performs a crawl operation by periodically checking web servers indicated in the profile for new or updated content objects that it believes end users or other local devices will be accessing in the near future. In one embodiment, in such a case, the network access gateway begins with a URL stored in the profile and follows links into web pages down to a configurable level.

In one embodiment, the network access gateway obtains the first page from the server and determines if any bandwidth intensive objects are present. In one embodiment, a bandwidth intensive object may be identified by its size. If bandwidth intensive, embedded objects exist, the network access gateway determines if new versions are available and downloads them. When new content objects have been identified, the network access gateway downloads only the bandwidth intensive (e.g., large), new content objects as they become available. The content objects obtained as a result of crawling is stored locally. In one embodiment, the precache memory storing such objects also stores their URLs, data type, size, the time when the data was acquired and the actual data itself. This process is transparent to the network and no change is needed to the content servers or the network to operate the network access gateway.

In an alternative embodiment, each new and/or updated content object is downloaded independent of size (after determining if the content object is a new version).

In one embodiment, individual content servers 201 may facilitate the crawl process by providing information on what has changed in that server. The server provides a summary of its changes to the network access gateway. The summary information may comprise the link, time, type and size of each object. In one embodiment, the content server runs a daemon that crawls the server itself to determine which objects are new. Then the server provides a list of URLs for those objects. The network access gateway compares the content in the list with the profile information (e.g., the list maintained by the network access gateway) to determine what content has changed and therefore what content, if any, is to be downloaded. The list may be updated and forwarded to the network access gateway at any rate, fixed or variable. The rate may be dependant on how often the information on the server is being updated. Alternatively, the list may be pulled by the device on-demand. In one embodiment, the fact that a new object was added triggers a process whereby an updated list is sent to the network access gateway.

In an alternative embodiment, a content provider provides the list.

A server may be located in the networked architecture to collect and aggregate the summaries, such as summary server 240. In one embodiment, each content server 201 sends the summary to summary server 240. In such a case, all the network access gateways need only contact one server to download summary information for groups of participating content servers in the network. Summary server 240 in FIG. 2 may be used to collect and aggregate summaries. Summary server 240 may unicast or multicast the information to one or more network access gateways 203.

In an alternative embodiment, one or more profile aggregators 260 are included in the networked environment. One or more of the profile aggregators 260 may comprise a multicast gateway. In such a case, the network access gateway 203 injects the profile into the network to one or more profile aggregators 260, which store profiles for one or more network access gateways 203. Profile aggregators 260 may merge the profiles to determine the most popular sites. Profile aggregators 260 perform crawl operations on behalf of the network access gateways and what information is to be sent to the network access gateway 203. In one embodiment, profile aggregator 260 may be the same device as summary server 240. One advantage of pushing the profile into the network is that the network brings multiple (e.g., all) profiles together and can multi-cast optionally the information to all the endpoints of the network that need the information. The multicast operation may be application-level multicast or IP multicast if available.

By combining the profiles, a more intelligent decision may be made as to what content is to be pushed back to the network access gateways 203. The profile aggregators 260 may forward the profiles to the servers and the servers accumulate the profiles and determine what information is to be sent and when to send it. An individual server may determine that a multicast of an updated content object is warranted. The individual server may determine that a subset of network access gateways 203 needs the information immediately and, therefore, that server sends the information to this subset of network access gateways 203 immediately. Other factors in determining when to send the information may include whether adequate bandwidth is available.

Note that in one embodiment, a network manager (e.g., content service administrator 230) may decide to push additional content to network access gateway 203 regardless of the profile.

In another embodiment, network access gateways 203 push their profiles to caches, such as content cache memories 225, inside the network. One or more of cache memories 225 may be coupled to ISPs. The network access gateways 203 push their profiles to one of cache memories 225, more than likely located nearby, which obtains updated information regarding the content specified by the profiles. Caches 225 may contact content servers 201 to obtain the information via unicast or multicast indicating that updated content objects or new content objects are available. Such updated information may be pushed or pulled from the servers. Once cache memory 225 has the updated information, it may unicast or multicast to the locally connected network access gateways 203.

Some or all of these crawling techniques may be used in the same networked environment. For example, an network access gateway 203 may crawl one or more sites to determine if any of the content objects have changed, while receiving information from web servers employing demeans to crawl their sites to identify updated or new content and while caches in the network or content servers provide updated and new content to the network access gateway 203.

Note that the precaching techniques described herein may utilize IP multicast or applications level multicast in which a hierarchy of servers located at various points in the internet 202 multicast among themselves. In such a case, servers higher in the hierarchy broadcast content to a group of servers lower in the hierarchy. An example of such an hierarchy is shown as hierarchical tree of multicast gateways 270 in FIG. 2A where content is received by one of the servers from one or more of content servers 201 and multicast to a lower level of servers. These servers may then forward the content objects to a lower level of the hierarchy or to network access gateways 203, via unicast and/or multicasts.

Hierarchical encoding of content may also be used to facilitate the transfer of content by reducing the bandwidth necessary to transfer it.

In one embodiment, a content server places bandwidth intensive version of content on the server along with a lesser bandwidth intensive version of the content, which most people will desire. Only the lesser bandwidth intensive version is linked to a page. The bandwidth intensive content is named for identification by a network access gateway 203 during the crawl operation and is downloaded instead of the lesser bandwidth intensive version of the content. Thus, when the user selects that content, the network access gateway 203 provides the bandwidth intensive version of the content if it has it; otherwise, the other version is provided.

In one embodiment, there is no separate network access gateway and only end systems (e.g., PCs) in a LAN. In such an embodiment, one end system could play the role of a master server and maintain a list of the objects precached by all other end systems in the LAN. In one embodiment, the master server is automatically elected (e.g., the first system in a LAN to perform the precaching) which has a list of precached objects of all other systems in the LAN. In one embodiment, to generate the list, a slave end system update the master precache as soon as there is a change in their local object precache (such as by, for example, adding an object, removing an object, changing an object, etc.). In the event one end system on a LAN wants to access a content object, the end system first checks its own precache and, if the object is not available, asks the master server for the availability of the object on another end system in the LAN. The master server indicates which end system has the content object so that the end system may request the object from the end system that has the object already precached. In essence, this arrangement is a distributed precache for a LAN and prevents networks without an access gateway to precache the same object redundantly.

Carrier edge caching may be complementary to the use of the network access gateway 203. However, the present invention does not require it.

Although devices, gateways, and servers described above are depicted as inside or connected to internet 202, each may be coupled to internet 202 and communicate in and through internet 202 using wellknown protocols.

An Exemplary Computer System

Figure 3:
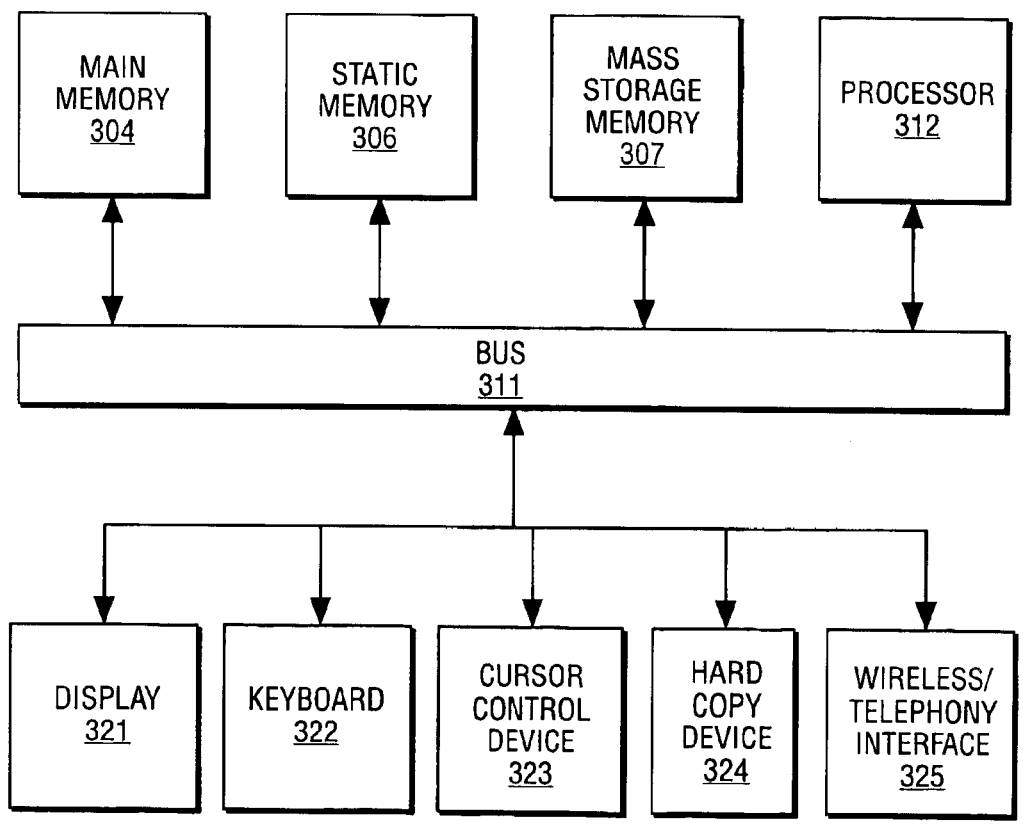
FIG. 3 is a block diagram of one embodiment of a computer system.

FIG. 3 is a block diagram of an exemplary computer system (e.g., PC, workstation, etc.). Referring to FIG. 3, computer system 300 may comprise an exemplary client 150 or server 100 computer system. Computer system 300 comprises a communication mechanism or bus 311 for communicating information, and a processor 312 coupled with bus 311 for processing information. Processor 312 includes a microprocessor, but is not limited to a microprocessor, such as, for example, Pentium™, PowerPC™, Alpha™, etc.

System 300 further comprises a random access memory (RAM), or other dynamic storage device 304 (referred to as main memory) coupled to bus 311 for storing information and instructions to be executed by processor 312. Main memory 304 also may be used for storing temporary variables or other intermediate information during execution of instructions by processor 312.

Computer system 300 also comprises a read only memory (ROM) and/or other static storage device 306 coupled to bus 3211 for storing static information and instructions for processor 312, and a data storage device 307, such as a magnetic disk or optical disk and its corresponding disk drive. Data storage device 307 is coupled to bus 311 for storing information and instructions.

Computer system 300 may further be coupled to a display device 321, such as a cathode ray tube (CRT) or liquid crystal display (LCD), coupled to bus 311 for displaying information to a computer user. An alphanumeric input device 322, including alphanumeric and other keys, may also be coupled to bus 311 for communicating information and command selections to processor 312. An additional user input device is cursor control 323, such as a mouse, trackball, trackpad, stylus, or cursor direction keys, coupled to bus 311 for communicating direction information and command selections to processor 312, and for controlling cursor movement on display 321.

Another device that may be coupled to bus 311 is hard copy device 324, which may be used for printing instructions, data, or other information on a medium such as paper, film, or similar types of media. Furthermore, a sound recording and playback device, such as a speaker and/or microphone may optionally be coupled to bus 311 for audio interfacing with computer system 300. Another device that may be coupled to bus 311 is a wired/wireless communication capability 325 to communication to a phone or handheld palm device.

Note that any or all of the components of system 300 and associated hardware may be used in the present invention. However, it can be appreciated that other configurations of the computer system may include some or all of the devices.

Whereas many alterations and modifications of the present invention, will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, content precaching methodology has been described.

We claim:

1. A method comprising:
    building the profile by manually configuring the profile, wherein manually configuring the profile comprises setting the profile to cause new content to be identified and stored in the cache prior to a present time;
    periodically checking servers in an external networked environment for new content based on a profile;
    storing content identified as new on the servers in a cache accessible by a network access gateway;
    the network access gateway thereafter detecting whether a request received from a client over a local network is for at least a portion of the identified new content previously stored in the cache; and
    returning the at least a portion of the identified new content to the client over the local network from the cache without having to access the servers again.

2. The method defined in claim 1 wherein the network access gateway builds the profile.

3. The method defined in claim 1 wherein building a profile comprises tracking an access pattern of an individual.

4. The method defined in claim 3 wherein tracking the access pattern comprises tracking web sites the individual accesses, the time the individual accesses the web sites, and the frequency of access by the individual to the web sites.

5. The method defined in claim 1 wherein building a profile comprises manually configuring the profile.

6. The method defined in claim 1 wherein the present time comprises a time of each day.

7. The method defined in claim 1 wherein building the profile comprises a network manager building the profile.

8. The method defined in claim 1 wherein building the profile comprises an application service provider building the profile.

9. The method defined in claim 7 wherein the profile comprises a time indication for each content to indicate a time at which the most recent copy of the content in the cache had been obtained.

10. The method defined in claim 1 wherein building the profile comprises a content provider building the profile.

11. The method defined in claim 1 wherein the profile comprises a list of content.

12. The method defined in claim 8 wherein the profile indicates the servers to be checked for new content.

13. The method defined in claim 1 wherein the request comprises a web page request.

14. The method defined in claim 1 wherein the cache is local to the network access gateway.

15. The method defined in claim 1 wherein the network access gateway provides access to the networked environment for at least one host.

16. The method defined in claim 15 wherein one or more hosts are coupled to the LAN.

17. The method defined in claim 1 further comprising the network access gateway forwarding the request to the networked environment to a server address in the request after determining that the at least a portion of the identified new content previously is not stored in the cache.

18. The method defined in claim 1 wherein the network access gateway interfaces a local area network (LAN) to the networked environment.

19. The method defined in claim 1 further comprising pushing the new content to the cache.

20. The method defined in claim 1 further comprising downloading the new content for storage in the cache.

21. The method defined in claim 1 wherein the network access gateway comprises a service gateway.

22. The method defined in claim 21 further comprising:
the cache contacting the servers identified by the profile.

23. The method defined in claim 22 further comprising at least one server pushing a portion of the new content to the cache.

24. The method defined in claim 22 further comprising the cache pulling a portion of the new content from at least one server.

25. The method defined in claim 1 wherein the network access gateway comprises an end point of a network connection.

26. The method defined in claim 1 further comprising the servers providing an indication as to the new content; and the network access gateway determining to download the new content and store the new content in the cache.

27. The method defined in claim 26 further comprising the servers running a daemon to identify new content.

28. The method defined in claim 1 further comprising the servers providing a summary of content changes; and the network access gateway determining to download the new content and store the new content in the cache based on the summary.

29. The method defined in claim 28 further comprising the servers providing a list of resource locators to the network access gateway; and the network access gateway comparing the list to the profile and downloading only updated objects.

30. The method defined in claim 1 further comprising injecting the profile into the networked environment to a profile aggregator.

31. The method defined in claim 1 further comprising a server aggregating new content for a plurality of network access gateways.

32. The method defined in claim 31 further comprising the server multicasting the new content to the plurality of network access gateways.

33. The method defined in claim 1 further comprising a network manager pushing additional content along with the new content to be stored in the cache.

34. The method defined in claim 1 further comprising:
the network access gateway pushing the profile to a cache in the networked environment; and
the cache obtaining the new content specified by the profile.

35. An apparatus comprising:
means for building the profile by manually configuring the profile, wherein the means for manually configuring the profile comprises means for setting the profile to cause new content to be identified and stored in the cache prior to a present time;
means for checking servers in an external networked environment for new content based on a profile;
means for storing content identified as new on the servers in a cache accessible by a network access gateway;
means for detecting via the network access gateway whether a request received from a client over a local network is for at least a portion of the identified new content previously stored in the cache; and
means for returning the at least a portion of the identified new content to the client over the local network from the cache without having to access the servers again.

36. The apparatus defined in claim 35 wherein the means for building a profile comprises means for tracking an access pattern of an individual.

37. The apparatus defined in claim 36 wherein the means for tracking the access pattern comprises means for tracking web sites the individual accesses, the time the individual accesses the web sites, and the frequency of access by the individual to the web sites.

38. The apparatus defined in claim 35 wherein the request comprises a web page request.

39. The apparatus defined in claim 35 wherein the means for precaching is local to the network access gateway.

40. The apparatus defined in claim 35 wherein the means for network access gateway forwards the request to the networked environment to a server address in the request after determining that the at least a portion of the identified new content previously is not stored in the cache.

41. The apparatus defined in claim 35 further comprising means for pushing the new content to the cache.

42. The apparatus defined in claim 35 further comprising means for downloading the new content for storage in the cache.

43. The apparatus defined in claim 35 further comprising means for providing an indication as to what content is new; and means for downloading the new content and storing the new content in the cache.

44. The apparatus defined in claim 35 further comprising means for providing a summary of content changes; and means for downloading the new content and storing the new content in the cache based on the summary.

45. The apparatus defined in claim 44 further comprising means for providing a list of resource locators to an network access gateway; and the network access gateway comparing the list to the profile and downloading only updated objects.

46. The apparatus defined in claim 35 further comprising means for sending the profile into the networked environment to a profile aggregator.

47. The apparatus defined in claim 35 further comprising means for multicasting the new content to the plurality of network access gateways.

48. An article of manufacture having one or more recordable medium with executable instructions stored thereon which, when executed by a processing device, cause the processing device to:
build the profile by manually configuring the profile, wherein manually configuring the profile comprises setting the profile to cause new content to be identified and stored in the cache prior to a present time;
check servers in an external networked environment for new content based on a profile;
store content identified as new on the servers in a cache accessible by a network access gateway;
detect via the network access gateway whether a request received from a client over a local network is for at least a portion of the identified new content previously stored in the cache; and
return the at least a portion of the identified new content to the client over the local network from the cache without having to access the servers again.

49. The article of manufacture defined in claim 48 further comprising executable instructions which, when executed by a processing device, cause the processing device to track an access pattern of an individual.

50. The article of manufacture defined in claim 49 further comprising executable instructions which, when executed by a processing device, cause the processing device to track web sites the individual accesses, the time the individual accesses the web sites, and the frequency of access by the individual to the web sites.

51. The article of manufacture defined in claim 48 further comprising executable instructions which, when executed by a processing device, cause the processing device to generate a web page request.

52. The article of manufacture defined in claim 48 further comprising executable instructions which, when executed by a processing device, cause the processing device to forward the request to the networked environment to a server address in the request after determining that the at least a portion of the identified new content previously is not stored in the cache.

53. The article of manufacture defined in claim 48 further comprising executable instructions which, when executed by a processing device, cause the processing device to forward the request to the networked environment to push the new content to the cache.

54. The article of manufacture defined in claim 48 further comprising executable instructions which, when executed by a processing device, cause the processing device to forward the request to the networked environment to download the new content for storage in the cache.

55. The article of manufacture defined in claim 48 further comprising executable instructions which, when executed by a processing device, cause the processing device to provide an indication as to the new content; and the network access gateway determining to download the new content and store the new content in the cache.

56. The article of manufacture defined in claim 48 further comprising executable instructions which, when executed by a processing device, cause the processing device to provide a summary of content changes; and the network access gateway determining to download the new content and store the new content in the cache based on the summary.

57. The article of manufacture defined in claim 56 further comprising executable instructions which, when executed by a processing device, cause the processing device to provide a list of resource locators to the network access gateway; and the network access gateway comparing the list to the profile and downloading only updated objects.

58. The article of manufacture defined in claim 48 further comprising executable instructions which, when executed by a processing device, cause the processing device to inject the profile into the networked environment.

59. The article of manufacture defined in claim 48 further comprising executable instructions which, when executed by a processing device, cause the processing device to multicast the new content to the plurality of network access gateways.

60. The article of manufacture defined in claim 48 further comprising executable instructions which, when executed by a processing device, cause the processing device to:

push via the network access gateway the profile to a cache in the networked environment; and obtain the new content specified by the profile.

61. The article of manufacture defined in claim 60 further comprising executable instructions which, when executed by a processing device, cause the processing device to:

contact the servers identified by the profile.

62. The article of manufacture defined in claim 61 further comprising executable instructions which, when executed by a processing device, cause the processing device to push a portion of the new content to the cache.

63. The article of manufacture defined in claim 61 further comprising executable instructions which, when executed by a processing device, cause the processing device to pull a portion of the new content from at least one server.

* * * * *